United States Patent [19]
Tamaru et al.

[11] Patent Number: 4,571,454
[45] Date of Patent: Feb. 18, 1986

[54] COORDINATE POSITION DIGITIZING SYSTEM

[75] Inventors: Hideshi Tamaru, Sagamihara; Kunio Shikakura, Tokyo; Nobuo Kitamura, Sagamihara; Kimiyoshi Yoshida, Zushi; Akio Sakano, Ibaragi, all of Japan

[73] Assignee: Sony Corporation, Tokyo, Japan

[21] Appl. No.: 548,766

[22] Filed: Nov. 4, 1983

[30] Foreign Application Priority Data

Nov. 11, 1982 [JP] Japan ............................... 57-198090

[51] Int. Cl.⁴ .......................................... G08C 21/00
[52] U.S. Cl. .................................................... 178/18
[58] Field of Search ............................ 178/18, 19, 20; 340/206

[56] References Cited

U.S. PATENT DOCUMENTS 3,999,012 12/1976 Dym ...................................... 178/18
4,009,338 2/1977 Dym et al. ............................ 178/18

Primary Examiner—Stafford D. Schreyer
Attorney, Agent, or Firm—Hill, Van Santen, Steadman & Simpson

[57] ABSTRACT

A coordinate position digitizing system comprises a position determining plate having a plurality of first parallel strip electrodes provided on one surface of a insulating layer to form plural groups thereof each connected in common and a plurality of second parallel electrodes each having the width wider than that of each of the first electrodes and provided on the other surface of the insulating layer to extend in the direction perpendicular to the first electrodes, a detecting electrode provided to face to the surface of the insulating layer on which the first electrodes are provided and connected through a predetermined capacitance to a reference potential point for producing a signal in response to a voltage obtained thereat, driving and controlling means for supplying with a constant voltage selectively to the groups of the first electrodes one after another during a first period and also supplying with the constant voltage selectively to the second electrodes one after another during a second period, and means for producing positional data defining positions of the detecting electrode on the position determining plate in both the direction of arrangement of the first electrodes and the direction of arrangement of the second electrodes in response to the signal derived from the detecting electrode.

3 Claims, 14 Drawing Figures

COORDINATE POSITION DIGITIZING SYSTEM

BACKGROUND OF THE INVENTION

This invention relates generally to coordinate position digitizing system adapted to be employed in apparatus for displaying and creating figures in which a tablet and a stylus used for drawing figures on the tablet are provided and a position of the stylus on the tablet is detected to produce data representing a figure drawn by the stylus on the tablet, and more particularly, to a coordinate position digitizing system in such a type as mentioned above in which a position of the stylus on the tablet is detected electrostatically.

There has been proposed a coordinate position digitizing system having a tablet and a stylus used for drawing figures on the tablet, in which a position of the stylus on the tablet is detected electrostatically with the configuration as shown in FIGS. 1 and 2. Referring to FIGS. 1 and 2, a position determining plate 10 which forms a tablet comprises, as shown in FIG. 2, a first transparent insulating layer 11, a plurality of strip electrodes $Y_1, Y_2, \text{---} Y_M$ arranged on the first transparent insulating layer 11 to extend parallel to one another at regularly spaced intervals, a second transparent insulating layer 12 covering the surface of the first transparent insulating layer 11 on which the electrodes $Y_1, Y_2, \text{---} Y_M$ are disposed, a plurality of strip electrodes $X_1, X_2, \text{---} X_N$ arranged on the second transparent insulating layer 12 to extend parallel one another at regularly spaced intervals in the direction perpendicular to the electrodes $Y_1, Y_2, \text{---} Y_M$, and a third transparent insulating layer 13 covering the surface of the second transparent insulating layer 12 on which the electrodes $X_1, X_2, \text{---} X_N$ are disposed. On the position determining plate 10 thus provided, a detecting electrode 20 which forms a stylus is placed. Each of the electrodes $X_1, X_2, \text{---} X_N$ which are located on the surface closer to the detecting electrode 20 than the surface on which the electrodes $Y_1, Y_2, \text{---} Y_M$ are located has the width narrower than that of each of the eletrodes $Y_1, Y_2, \text{---} Y_M$. The detecting electrode 20 is grounded through a predetermined constant capacitance $C_L$.

During a predetermined period, switches $32_1, 32_2, \text{---} 32_N$ are supplied successively with pulses from corresponding output terminals $N_1, N_2, \text{---} N_N$ of a shift register 31 to be turned to respective terminals B thereof from respective terminals A thereof, so that the electrodes $X_1, X_2, \text{---} X_N$ are supplied successively with the positive voltage $V_{CC}$ of a voltage source $+V_{CC}$ during each period of the pulse from the shift register 31. During another predetermined period, similarly, switches $34_1, 34_2, \text{---} 34_M$ are supplied successively with pulses from corresponding output terminals $M_1, M_2, \text{---} M_M$ of a shift register 33 to be turned to respective terminals B thereof from respective terminals A thereof, so that the electrodes $Y_1, Y_2, \text{---} Y_M$ are supplied successively with the voltage $V_{CC}$ of the voltage source $+V_{CC}$ during each period of the pulse from the shift register 33.

Under such conditions, a voltage $V_O$ at the detecting electrode 20 is represented by the following equation:

$$V_O = \frac{C_P}{C_P + C_L} V_{CC}$$

where $C_P$ stands for a capacitance obtained between the detecting electrode 20 and one of the electrodes $X_1, X_2, \text{---} X_N$ or $Y_1, Y_2, \text{---} Y_M$ to which the voltage $V_{CC}$ is supplied. According to this equation, it is understood that the voltage $V_O$ is the higher, the larger the capacitance $C_P$ is, that is, the shorter distance to the electrode supplied with the voltage $V_{CC}$ from the detecting electrode 20 is. Accordingly, when the electrodes $X_1, X_2, \text{---} X_N$ or $Y_1, Y_2, \text{---} Y_M$ are supplied successively with the voltage $V_{CC}$ during each period of the pulse from the shift register 31 or 33 and the capacitance $C_P$ varies every period of the pulse from the shift register 31 or 33 in such a manner as shown in FIG. 3, the voltage $V_O$ at the detecting electrode 20 varies in stepwise manner every constant period $T_O$ as shown in FIG. 4 and takes the maximum value when the voltage $V_{CC}$ is supplied to one of the electrodes $X_1, X_2, \text{---} X_N$ or $Y_1, Y_2, \text{---} Y_M$ which is most close to the detecting electrode 20.

Then, in response to the voltage $V_O$ at the detecting electrode 20 thus obtained, a position of the detecting electrode 20 on the position determining plate 10 in a X direction in which the electrodes $X_1, X_2, \text{---} X_N$ are arranged or a Y direction in which the electrodes $Y_1, Y_2, \text{---} Y_M$ are arranged in detected.

In the concrete, the voltage $V_O$ at the detecting electrode 20 is supplied through an amplifier to a resonant circuit and a signal $S_B$ having a constant frequency and the maximum amplitude at a time point delayed by a predetermined time from a time point at which the voltage $V_O$ takes the maximum value, as shown in FIG. 4, is obtained from the resonant circuit. This signal $S_B$ is supplied to a Schmitt trigger circuit and a signal $S_Z$ which falls to a low level from a high level when the signal $S_B$ crosses a predetermined positive level $V_S$ to be high from low and rises to the high level from the low level when the signal $S_B$ crosses the zero level to be negative from positive is obtained from the Schmitt trigger circuit. Then, a time $T_D$ having lapsed from an instant $t_1$ at which the first electrode $X_1$ or $Y_1$ located at the starting end of the position determining plate 10 is supplied with the voltage $V_{CC}$ to another instant $t_2$ at which the signal $S_Z$ first rises, is detected by counting clock pulses with such a sufficiently high frequency as to have a cyclical period corresponding to, for example, one fortieth of the period $T_O$ by a counter during the period from the instant $t_1$ to the instant $t_2$.

Output data $D_E$ obtained from the counter at the instant $t_2$, which represent the time $T_D$, correspond to the position of the detecting electrode 20 on the position determined plate 10 in the X direction or the Y direction, and the position of the detecting electrode 20 on the position determining plate 10 can be detected in response to the output data $D_E$ of the counter.

In the above mentioned system, if output data $D_{EX}$ and $D_{EY}$ obtained from the counter at the instant $t_2$ in the detecting period for detecting the position of the detecting electrode 20 on the position determining plate 10 in the X direction and in the detecting period for detecting the position of the detecting electrode 20 in the Y direction, respectively, are in linear relations with actual positions of the detecting electrode 20 on the position determining plate 10 in the X direction and the Y direction, as shown by absolute lines 1X and 1Y in FIGS. 5 and 6, respectively, the position of the detecting electrode 20 on the position detecting plate is to be detected accurately. However, according to practical measure, the data $D_{EX}$ and $D_{EY}$ are not in the linear relations but in nonlinear relations with the actual positions of the detecting electrode 20 on the position determining plate 10 in the X direction and the Y direction such as shown by curves 2X and 2Y in FIGS. 5 and 6, resepctively. The result shown by the curves 2X and 2Y in FIGS. 5 and 6 has been obtained under such conditions that the interval between the centers of each two adjacent electrodes $X_1, X_2, --- X_N$ or $Y_1, Y_2, --- Y_M$ is 4.0 mm, the width of each of the electrodes $X_1, X_2, --- X_N$ is 1.2 mm, the wdith of each of the electrodes $Y_1, Y_2, --- Y_M$ is 3.5 mm, the thickness of each of the transparent insulating layers 12 and 13 is 0.175 mm, the period $T_O$ is 31.25 microsecond and the frequency of shift pulses for the shift register 31 and 33 is 32 kHz.

As spparent from FIGS. 5 and 6, the data $D_{EX}$ and $D_{EY}$ become larger by $\alpha$ and $\beta$, respectively, than respective ideal values when the detecting electrode 20 is located at the center of each of the electrodes $X_1, X_2, --- X_N$ and $Y_1, Y_2, --- Y_M$, and become smaller by $\alpha$ and $\beta$, respectively, than respective ideal value when the detecting electrode 20 is located at a position between each adjacent two of the electrodes $X_1, X_2, --- X_N$ and $Y_1, Y_2, --- Y_M$. The maximum deviation $\beta$ of the data $D_{EY}$ representing the position of the detecting electrode 20 on the position determining plate 10 in the Y direction corresponds to about one fortieth of the interval between the centers of each adjacent two of the electrodes $Y_1, Y_2, --- Y_N$, that is, about 0.1 mm and therefore is relatively small, and, on the other hand, the maximum deviation $\alpha$ of the data $D_{EX}$ representing the position of the detecting electrode 20 on the position determining plate 10 in the X direction corresponds to about one tenth of the interval between the centers of each adjacent two of the electrodes $X_1, X_2, --- X_N$, that is, about 0.3 mm and therefore relatively large. Accordingly, acurrate positional detection on the position determining plate can not be performed, especially, in the X direction.

The reason why the maximum deviation $\alpha$ of the data $D_{EX}$ is larger than the maximum deviation $\beta$ of the data $D_{EY}$ is that the space between each adjacent two of the electrode $X_1, X_2, --- X_N$ is larger than the space between each adjacent two of the electrodes $Y_1, Y_2, --- Y_M$. Considering this only, it seems to be possible measures to increase the width of each of the electrodes $X_1, X_2, --- X_N$ to be substantially identical to the width of each of the electrodes $Y_1, Y_2, --- Y_M$ so as to narrow the space between each adjacent two of the electrodes $X_1, X_2, --- X_N$ to be substantially identical to the space between each adjacent two of the electrodes $Y_1, Y_2, --- Y_M$ in order to reduce the deviations of the data $D_{EX}$ from the ideal value. However, since the electrodes $X_1, X_2, --- X_N$ must be arranged not to have a shielding effect to the electrodes $Y_1, Y_2, --- Y_M$, which are disposed on the surface more distant from the detecting electrode 20 than the surface on which the electrodes $X_1, X_2, --- X_N$ are disposed, during the detecting period for detecting the position of the detecting electrode 20 in the position determining plate 10 in the Y direction, the width of each of the electrodes $X_1, X_2, --- X_N$ can not be widened.

Further, it is also considered to be another measures for reducing the deviations of the data $D_{EX}$ to divide each of the electrodes $X_1, X_2, --- X_N$ into plural individual electrodes with a narrow space between each adjacent two of them. However, in such a case, the number of the electrodes used for detecting the position of the detecting electrode 10 on the position determining plate 10 in the X direction is increased plural times, and as a result of this, the number of the switches $31_1, 32_2, --- 32_N$ connected to these electrodes and the number of the output terminals $N_1, N_2, --- N_N$ of the shift register 31 have to be also increased plural times. This results in the disadvantage that the circuit configuration in the system is so complicated and the cost of the system mounts up.

OBJECTS AND SUMMARY OF THE INVENTION

Accordingly, it is an object of the present invention to provide an improved coordinate position digitizing system performing positional detection electrostatically, which can avoid the above described problems and disadvantages encountered with the prior art.

Another object of the present invention is to provide an improved coordinate position digitizing system employing a position determining plate having a plurality of first strip electrodes extending parallel to one another to be supplied with a constant voltage selectively and a plurality of second strip electrodes insulated from the first electrodes and extending parallel one another in the direction perpendicular to the first electrodes to be supplied with the constant voltage selectively, and a detecting electrode provided on the position determining plate for producing a signal concerning the position thereof on the position determining plate in response to a voltage obtained thereat, which can produce accurate positional data defining positions of the detecting electrode on the position determining plate in both the direction of arrangement of the first electrodes and the direction of arrangement of the second electrodes in digitizing a position on the position determining plate.

According to an aspect of the present invention, there is provided a coordinate position digitizing system comprising a position determining plate having a plurality of first parallel strip electrodes forming plural groups thereof each connected in common and a plurality of second parallel strip electrodes each having the width wider than that of each of the first electrodes and extending in the direction perpendicular to the first electrodes with a space for insulating the second electrodes from the first electrodes, an detecting electrode provided on the position determining plate to face to the plane on which the first electrodes are disposed and connected through a predetermined capacitance to a reference potential point for producing a signal in response to a voltage obtained thereat, driving and controlling means for supplying with a constant voltage selectively to the groups of the first electrodes one after another during a first period and also selectively to the second electrodes one after another during a second period different from the first period, and information producing means for producing positional data defining positions of the detecting electrode on the position determining plate in both direction of arrangement of the first electrodes and the direction of arrangement of the second electrodes in response to the signal derived from the detecting electrode.

With the coordinate position digitizing system thus constituted in accordance with the present invention, the first electrodes can be arranged with a relatively narrow space between each adjacent two of them without having shielding effect to the second electrodes, and therefore the positional data defining the position of the detecting electrode on the position determining plate in the direction of arrangement of the first electrodes can be obtained accurately in the same grade as the data defining the position of the detecting electrode on the position determining plate in the direction of arrangement of the second electrodes.

The above, and other objects, features and advantages of the present invention will become apparent from the following detailed description thereof taken in conjunction with the accompanying drawings.

DESCRIPTION OF THE PREFERRED EMBODIMENT

Figure 1:
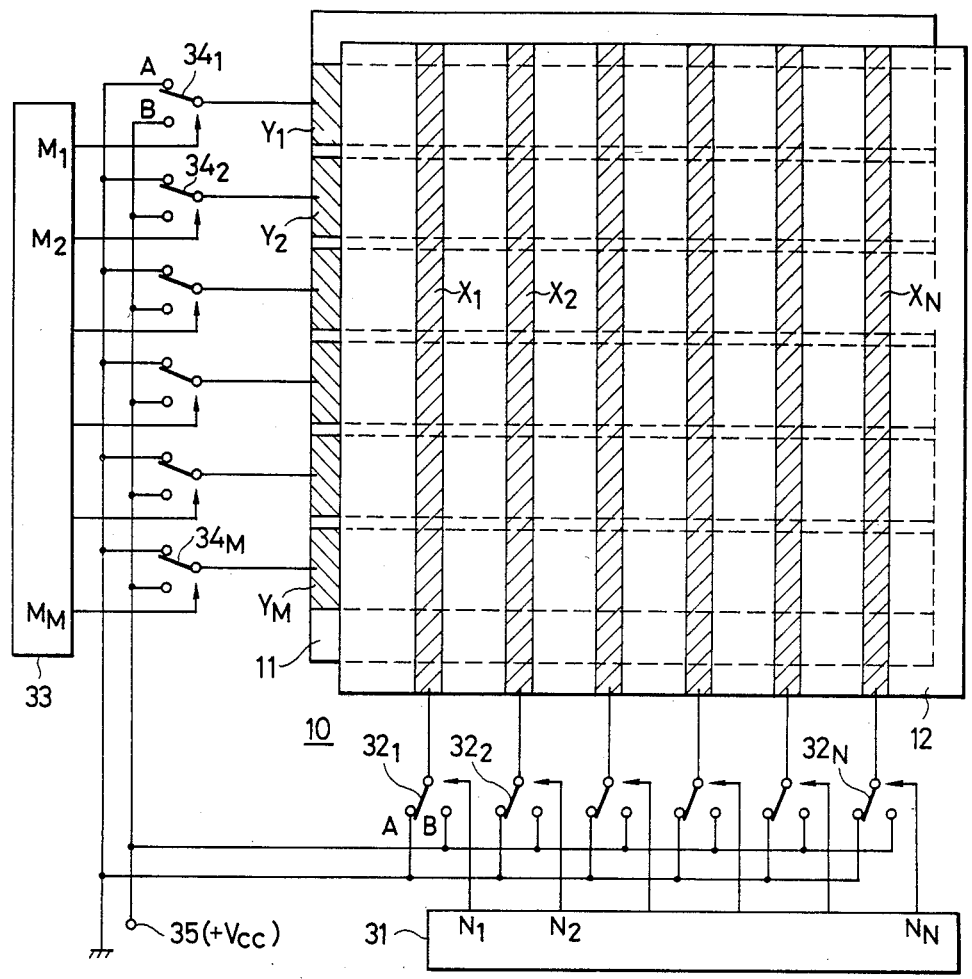
FIG. 1 is a schematic representation of an essential part of a previously proposed coordinate position digitizing system performing positional detection electrostatically.
Figure 2:
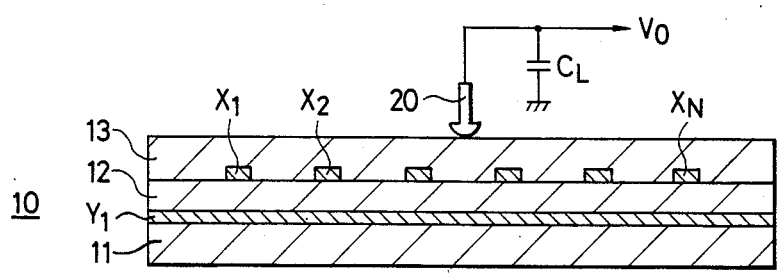
FIG. 2 is a sectional view of a position determining plate employed in the system shown in FIG. 1.
Figure 3:
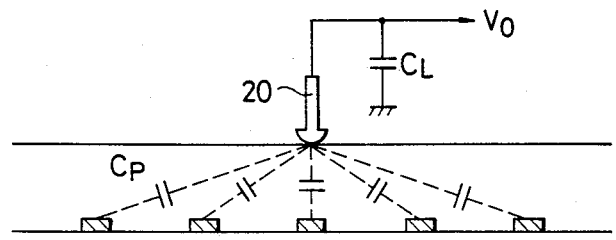
FIGS. 3 and 4 are illustrations used for explaining the operation of the system shown in FIG. 1.
Figure 4:
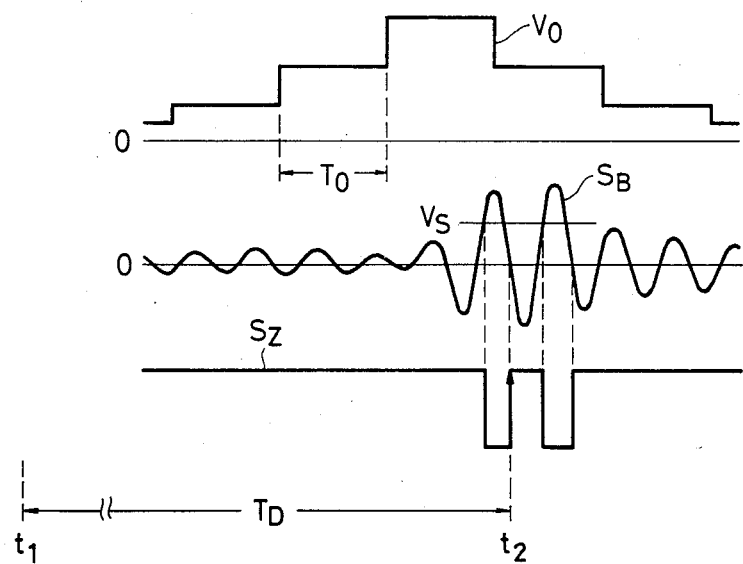
Figure 7:
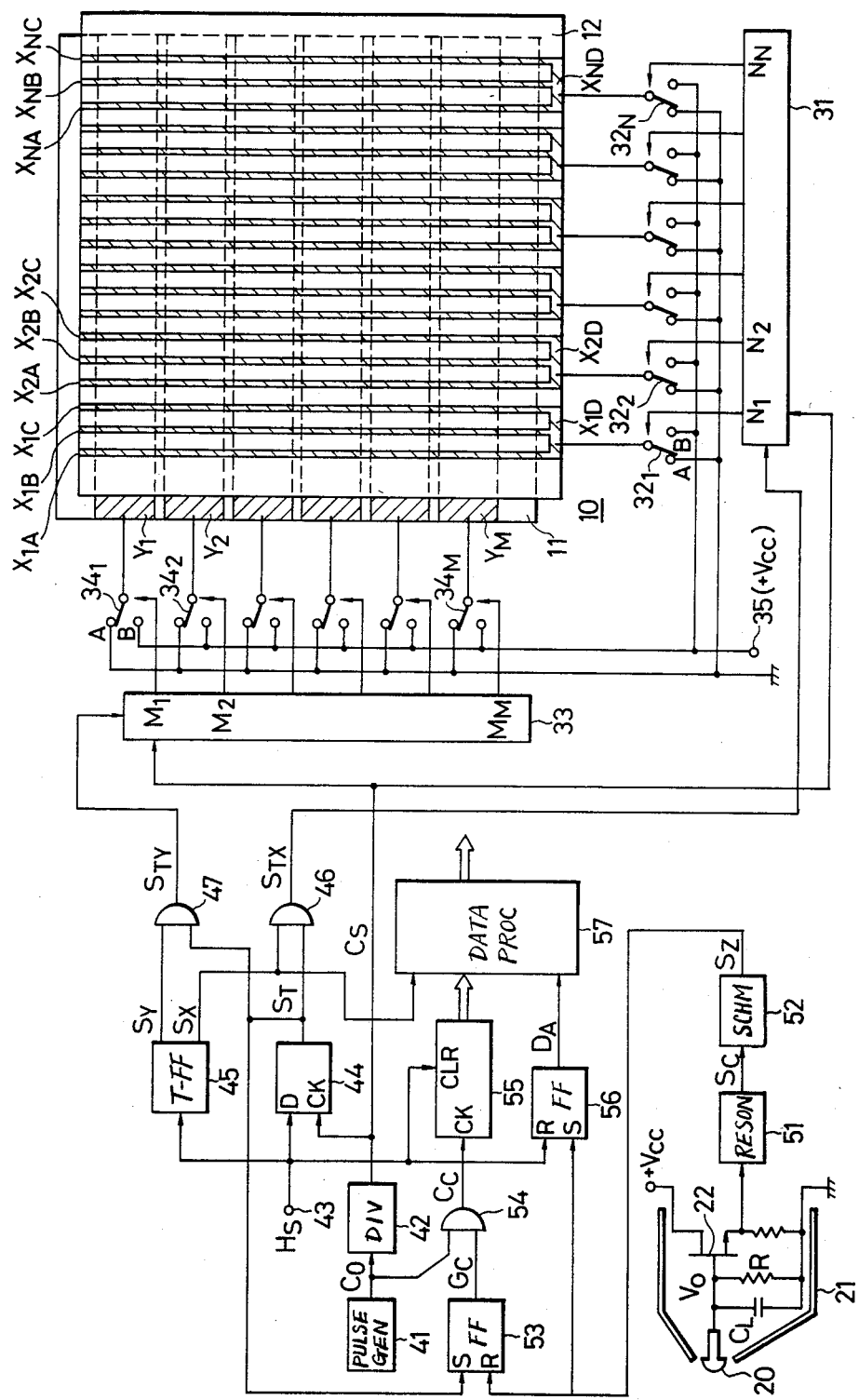
FIG. 7 is a schematic representation of one embodiment of coordinate position digitizing system according to the present invention.

FIG. 7 shows an example of a coordinate position digitizing system according to the present invention. In FIG. 7, elements and parts corresponding to those of FIG. 1 are marked with the same references. In this example, a position determining plate 10 which forms a tablet comprises a first transparent insulating layer 11, a plurality of strip electrodes $Y_1, Y_2, - - - Y_M$ arranged on the first transparent insulating layer 11 to extending parallel to one another at regularly spaced intervals, a second transparent insulating layer 12 covering the surface of the first transparent insulating layer 11 on which the electrodes $Y_1, Y_2, - - - Y_M$ are disposed, a plurality of strip electrodes $X_{1A}, X_{1B}, X_{1C}, X_{2A}, X_{2B}, X_{2C}, - - - X_{NA}, X_{NB}, X_{NC}$ arranged on the second transparent insulating layer 12 to extending parallel to one another at regularly spaced intervals each being one third of the interval of the electrodes $Y_1, Y_2, - - - Y_M$ in the direction perpendicular to the electrodes $Y_1, Y_2, - - - Y_M$, conductors $X_{1D}, X_{2D}, - - - X_{ND}$ connected in common to the electrodes $X_{1A}-X_{1C}, X_{2A}-X_{2C}, - - - X_{NA}-X_{NC}$, respectively, and a third transparent insulating layer (not shown in FIG. 7) covering the surface of the second transparent insulating layer 12. The electrodes $Y_1, Y_2, - - - Y_M$ and $X_{1A}-X_{1C}, X_{2A}-X_{2C}, - - - X_{NA}-X_{NC}$ are formes into transparent electrodes. In this example, the following selections are made as an example: the interval between the centers of each adjacent two of the electrodes $Y_1, Y_2, - - - Y_M$ is 4.0 mm, the interval between the centers of each adjacent two of the electrodes $X_{1A}, X_{1B}, X_{1C} - - - X_{NA}, X_{NB}, X_{NC}$ is 1.33 mm, the width of the electrodes $Y_1, Y_2, - - - Y_M$ is 3.5 mm, and the width of the electrodes $X_{1A}, X_{1B}, X_{1C}, - - - X_{NA}, X_{NB}, X_{NC}$ are 0.4 mm.

Figure 8:
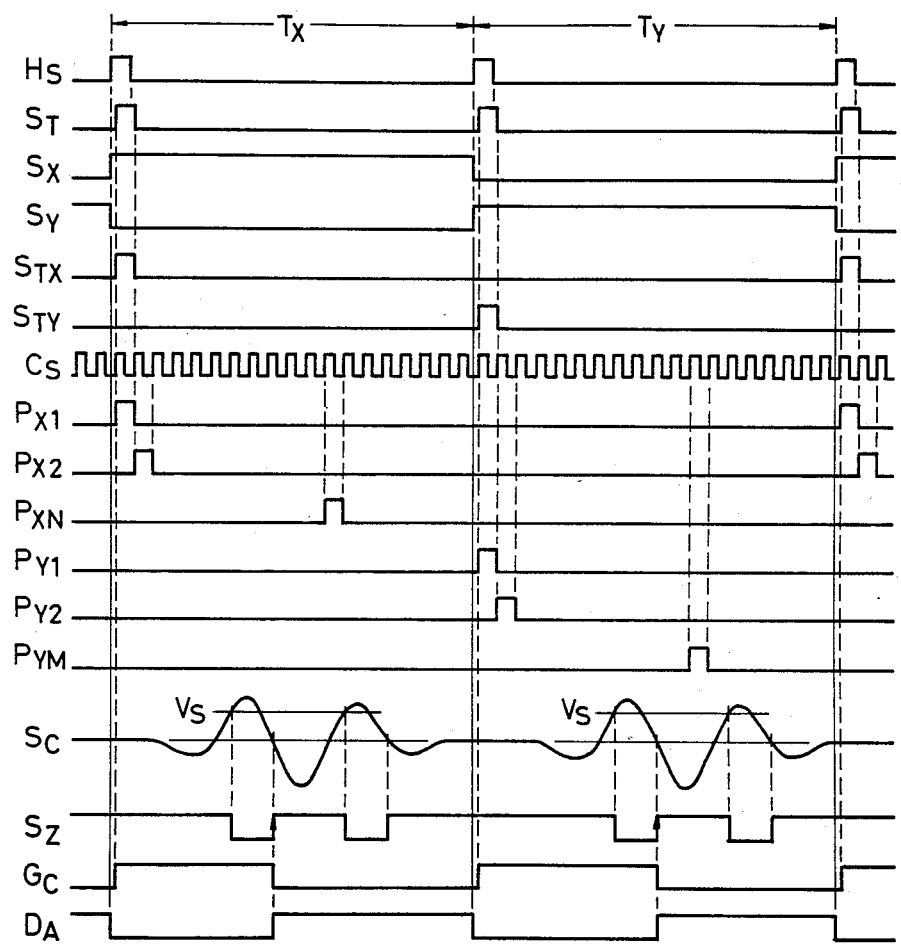
FIGS. 8 to 13 are waveforms and illustrations used for explaining the operation of the embodiment shown in FIG. 7.

From a clock pulse generating circuit 41, master clock pulses $C_O$ having a frequency of, for example, 1280 kHz are obtained and supplied to a frequency dividing circuit 42 to be divided in frequency into one fortieth to produce clock pulses $C_S$ having a frequency of 32 kHz as shown in FIG. 8. The clock pulses $C_S$ are supplied to shift registers 31 and 33 as shift pulses.

In the meanwhile, a synchronous signal $H_S$ which is composed of pulses each having the pulse width corresponding to one cyclical period of the clock pulses $C_S$ and appearing every constant period, as shown in FIG. 8, is supplied through a terminal 43 to a data terminal D of a D-flip flop 44, and the clock pulses $C_S$ are supplied to a clock terminal CK of the D-flip flop circuit 44. This D-flip flop 44 produces a signal $S_T$ having a rising edge coinciding with the rising edge of one of the clock pulses $C_S$ appearing immediately after the front edge of the synchronous signal $H_S$ and the falling edge coinciding with the rising edge of another of the clock pulses $C_S$ appearing immediately after the rear edge of the synchronous signal $H_S$, as shown in FIG. 8. The synchronous signal $H_S$ is supplied through the terminal 43 to a T-flip flop 45 and a signal $S_X$ taking a high level during every other period $T_X$ defined by each pulse of the synchronous signal $H_S$ and a low level during another every other period $T_Y$ also defined by each pulse of the synchronous signal $H_S$ as shown in FIG. 8 and a signal $S_Y$ taking the low level and the high level alternately in the manner opposite to the signal $S_X$ as shown in FIG. 8 are obtained from the T-flip flop 45.

Then, the signal $S_T$ obtained from the D-flip flop 44 and the signal $S_X$ obtained from the T-flip flop 45 are supplied to an AND gate 46 so that the signal $S_T$ is extracted every period $T_X$ to the output of the AND gate 46 to produce a signal $S_{TX}$. The signal $S_{TX}$ is supplied to the shift register 31 as a starting pulse. Similarly, the signal $S_T$ obtained from the D-flip flop 44 and the signal $S_Y$ 47 so that the signal $S_T$ is extracted every period $T_Y$ to the output of the AND gate 47 to produce a signal $S_{TY}$. The signal $S_{TY}$ is supplied to the shift register 33 as a sift pulse.

Accordingly, in each period $T_X$, pulses $P_{X1}, P_{X2}, - - - P_{XN}$ which appear successively with a constant pulse width identical to a period of one cycle of the clock pulses $C_S$, as shown in FIG. 8, are obtained at the output terminals $N_1, N_2, - - - N_N$ of the shift register 31. These pulses $P_{X1}, P_{X2}, - - - P_{XN}$ are supplied to corresponding switches $32_1, 32_2, - - - 32_N$, so that the switches $32_1, 32_2, - - - 32_N$ are turned to respective terminals B from respective terminals A successively. Consequently, every three electrodes connected in common $X_{1A}-X_{1C}, - - - X_{NA}-X_{NC}$ are supplied with a voltage $V_{CC}$ from a voltage source $+V_{CC}$ through at terminal 35 successively. Similarly, in the period $P_Y$, pulses $P_{Y1}, P_{Y2}, - - - P_{YN}$ which appear successively with a constant pulse width identical to a period of one cycle of the clock pulses $C_S$, as shown in FIG. 8, are obtained at the output terminals $M_1, M_2, - - - M_N$ of the shift register 33. These pulses $P_{Y1}, P_{Y2}, - - - P_{YN}$ are supplied to corresponding switches $34_1, 34_2, - - - 34_N$, so that the switches $34_1, 34_2, - - - 34_N$ are turned to respective terminals B from respective terminals A successively. Consequently, the electrodes $Y_1, Y_2 - - - Y_M$ are supplied with a voltage $V_{CC}$ from a voltage source $+V_{CC}$ through a terminal 35 one after another.

A detecting electrode 20 contained in a shielding housing 21 is put on the position determining plate 10 and grounded through a capacitance $C_L$ in the shielding housing 21. Further, the detecting electrode 20 is connected to the gate of a field effect transistor 22 in the shielding housing 21, and a biasing resistor R is connected between the gate and ground.

Figure 9:
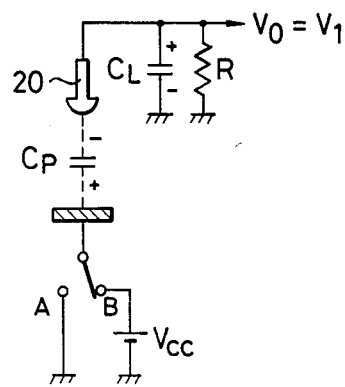
Figure 10:
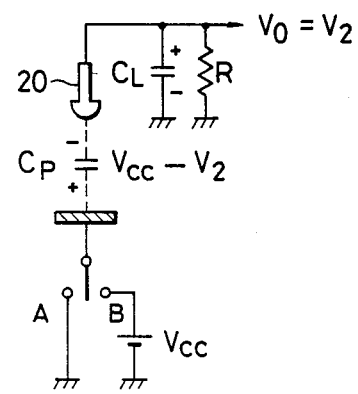
Figure 11:
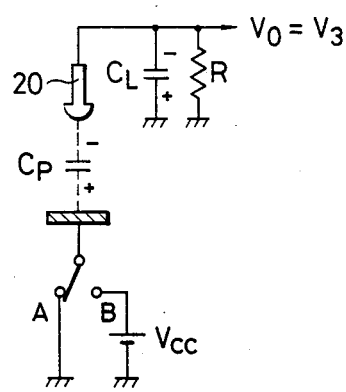
Figure 12:
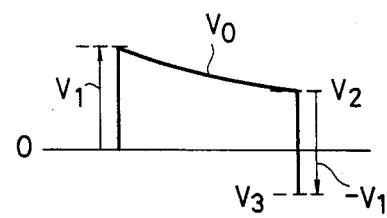

Referring now to FIG. 9, when a switch is turned to a terminal A from a terminal B so that a voltage $V_{CC}$ is supplied to an electrode, a voltage $V_O$ at the detecting electrode 20, which takes the ground level immediately before the switch is turned, is represented by the equation:

$$V_O = V_1 = \frac{C_P}{C_p + C_L} V_{CC}$$

where $C_P$ stands for the capacitance between the electrode and the detecting electrode 20. After that, the discharge is caused through the resistor R from the capacitance $C_L$ and the voltage $V_O$ is reduced gradually as shown in FIG. 12. Accordingly, as shown in FIG. 10, the voltage $V_O$ takes a level $V_2$ and the voltage across the capacitance $C_P$ takes a negative level $-V_2$ at an instant at which the voltage $V_{CC}$ is switched off to be supplied to the electrode. Then, as shown in FIG. 11, the voltage $V_O$ takes a level $V_3$, when the electrode is grounded through the terminal A of the switch. Since the equation:

$$V_3(C_p + C_L) = V_2 \cdot C_L - (V_{CC} - V_2)C_p$$
$$= V_2(C_p + C_L) - V_{CC} \cdot C_p$$

is satisfied, the voltage $V_3$ is expressed as follows;

$$V_3 = V_2 - \frac{C_p}{C_p + C_L} V_{CC}$$
$$= V_2 - V_1$$

Figure 13:
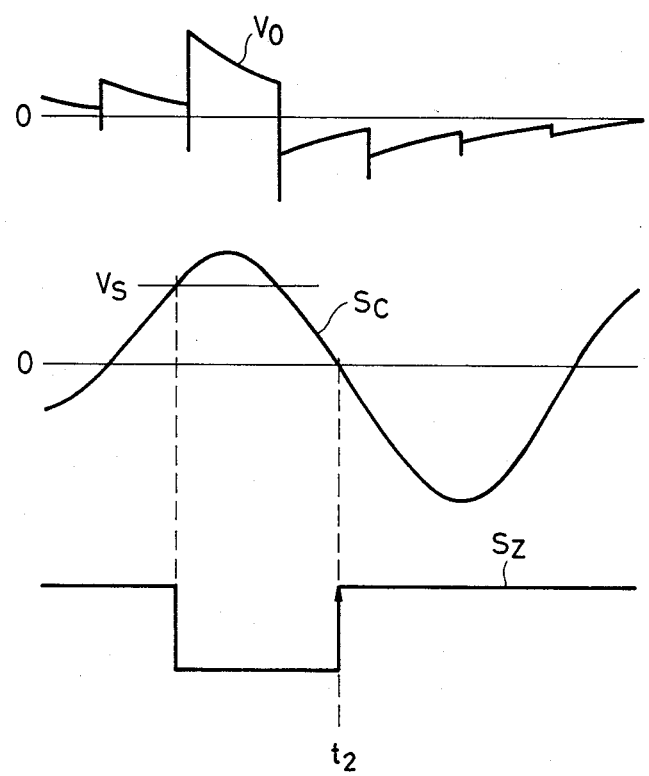

Accordingly, under the situation in which the constant voltage $V_{CC}$ is supplied to the groups of the electrodes $X_{1A}-X_{1C}$, $X_{2A}-X_{2C}$, - - - $X_{NA}-X_{NC}$ or the electrodes $Y_1$, $Y_2$, - - - $Y_M$ one after another and the capacitance $C_P$ formed between one these groups of the electrodes or one of these electrodes supplied with the voltage $V_{CC}$ and the detecting electrode 20 varies in a stepwise manner every constant period defined by the pulses $P_{X1}$, $P_{X2}$, - - - $P_{XN}$ or $P_{Y1}$, $P_{Y2}$, - - - $P_{YN}$, the voltage $V_O$ varies in such a manner as shown in FIG. 13 so as to take the maximum level when one of the groups of the electrodes $X_{1A}-X_{1C}$, $X_{2A}-X_{2C}$, - - - $X_{NA}-X_{NC}$ or one of the electrodes $Y_1$, $Y_2$, - - - $Y_M$ which is most close to the detecting electrode 20 is supplied with the voltage $V_{CC}$.

The voltage $V_O$ thus obtained at the detecting electrode 20 is amplified by the feild effect transistor 22 and supplied to a resonant circuit 51 having a resonant frequency of, for example, 6.25 kHz. From this resonant circuit 51, a signal $S_C$ which crosses over the ground level on the way to be negative from positive at a time point delayed by a predetermined time from the time point at which the voltage $V_O$ takes the maximum level thereof, as shown in FIGS. 8 and 13, is obtained to be supplied to a Schmitt trigger circuit 52. As a result of this, a signal $S_Z$ which falls to be a low level from a high level at an instant at which the signal $S_C$ crosses over a predetermined level $V_S$ on the way to be high from low and rises to be the high level from the low level at the instant at which the signal $S_C$ crosses over the ground level on the way to be negative from positive, as shown in FIGS. 8 and 13, is obtained from the Schmitt trigger circuit 52. Then, the signal $S_T$ from the D-flip flop 44 and the signal $S_Z$ obtained from the Schmitt trigger circuit 52 are supplied to a set terminal S and a reset terminal R of a S-R flip flop 53, respectively, and a signal $G_C$ which has a rising edge coinciding with the rising edge of the signal $S_T$ at an instant at which the first one of the groups of the electrodes $X_{1A}-X_{1C}$, $X_{2A}-X_{2C}$, - - - $X_{NA}-X_{NC}$ or the first one of the electrodes $Y_1$, $Y_2$, - - - $Y_M$ located at the starting end of the position determining plate 10 is supplied with the voltage $V_{CC}$ in the beginning of the period $T_X$ or $T_Y$ and a falling edge coinciding with the first rising edge of the signal $S_Z$, which is indicated by an upward arrow in FIG. 8, at the instant $t_2$ at which the signal $S_C$ first crosses over the ground level on the way to be negative from positive, is obtained from the S-R flip flop 53.

The master clock pulses $C_O$ having the frequency of 1280 kHz obtained from the clock pulse generating circuit 41 and the signal $G_C$ obtained from the S-R flip flop 53 are supplied to an AND gate 54, and the master clock pulses $C_O$ are extracted at the AND gate 54 during the period in which the signal $G_C$ takes a high level. While, the synchronous signal $H_S$ is supplied through the terminal 43 to a clear terminal of a counter 55 and the counter 55 is cleared by the front edge of the synchronous signal $H_S$. After clearing the counter 55, the clock pulses $C_C$ extracted at the AND gate 54 are supplied to a clock terminal CK of the counter 55 and counted therein during the period in which the signal $G_C$ takes the high level. Accordingly, output data obtained from the counter 55 represent the position of the detecting electrode 20 on the position determining plate 10 in the X direction during a period from the falling edge of the signal $G_C$ appearing in one of alternate periods $T_X$ to the front edge of the synchronous signal $H_S$ appearing thereafter, and also represent the position of the detecting electrode 20 on the position determining plate 10 in the Y direction during a period from the falling edge of the signal $G_C$ appearing in one of another alternate periods $T_Y$ to the front edge of the synchronous signal $H_S$ appearing thereafter.

The synchronous signal $H_S$ and the signal $S_Z$ obtained from the Schmitt trigger circuit 52 are supplied to a reset terminal R and a set terminal S of a S-R flip flop 56, respectively, and a signal $D_A$ which takes a high level during each period in which the output data obtained from the counter 55 represent the position of the detecting electrode 20 on the position determining plate 10, as shown in the lowermost side of FIG. 8, is obtained from the S-R flip flop 56.

Then, the signal $S_X$ and $S_Y$ which are obtained from the T-flip flop 45 indicate alternate detecting periods $T_X$ in which the position of the detecting electrode 20 on the position determining plate 10 in the X direction is detected and another alternate detecting periods $T_Y$ in which the position of the detecting electrode 20 on the position determining plate 10 in the Y direction is detected, respectively, the output data from the counter 55, and the signal $D_A$ from the S-R flip flop 56 are supplied to a data processing circuit 57, and positional data defining the positions of the detecting electrode 20 on the position determining plate 10 in the X direction and the Y direction are obtained from the data processing circuit 57.

Figure 6:
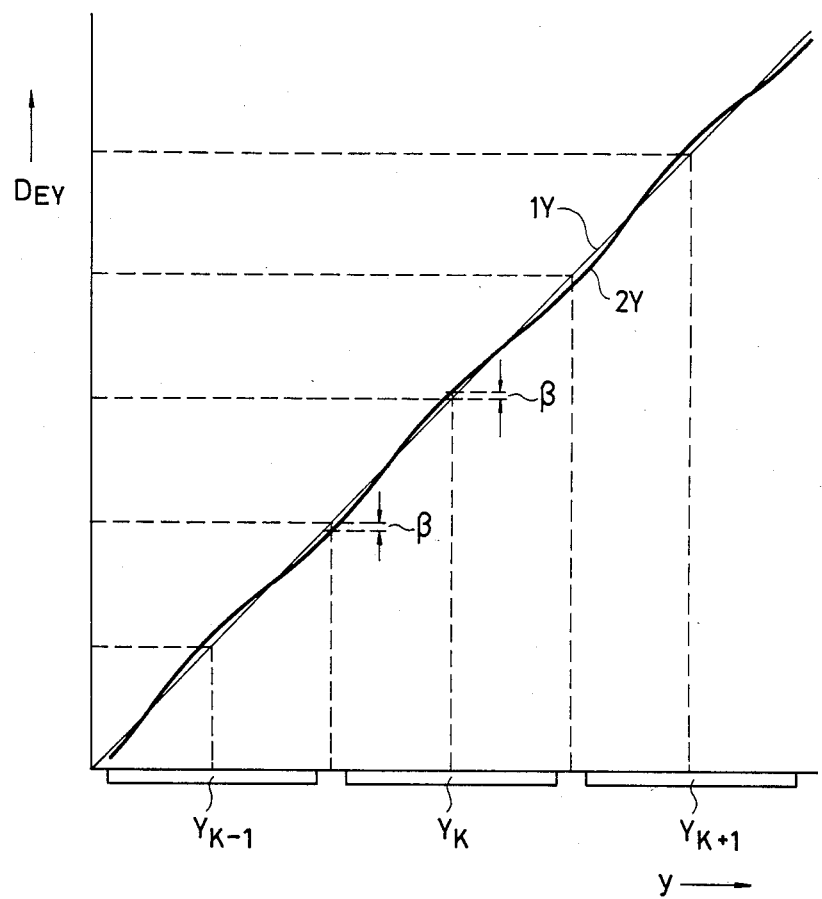

With the embodiment shown in FIG. 7, output data $D_{EY}$ which are obtained from the counter 55 during a period in which the signal $D_A$ takes the high level within the detecting period $T_Y$ are in an almost linear relation with an actual position y of the detecting electrode 20 on the position determining plate 10 in the Y direction, as shown by the curve 2Y in FIG. 6.

Figure 5:
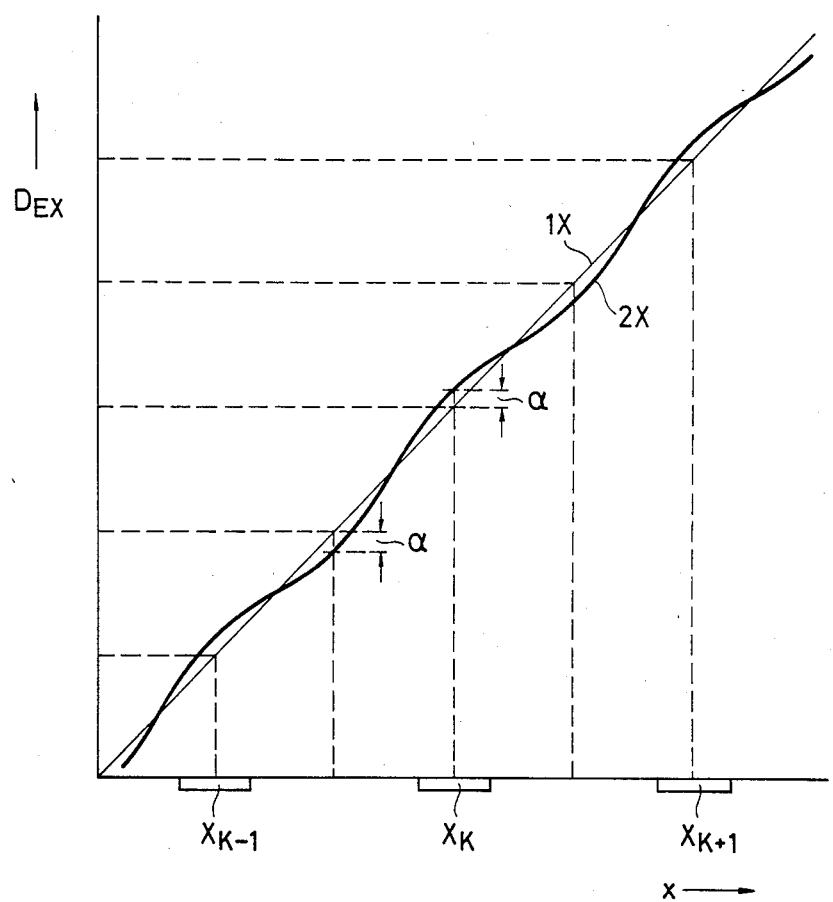
FIGS. 5 and 6 are graphs used for explaining the detecting characteristics of the system shown in FIG. 1.
Figure 14:
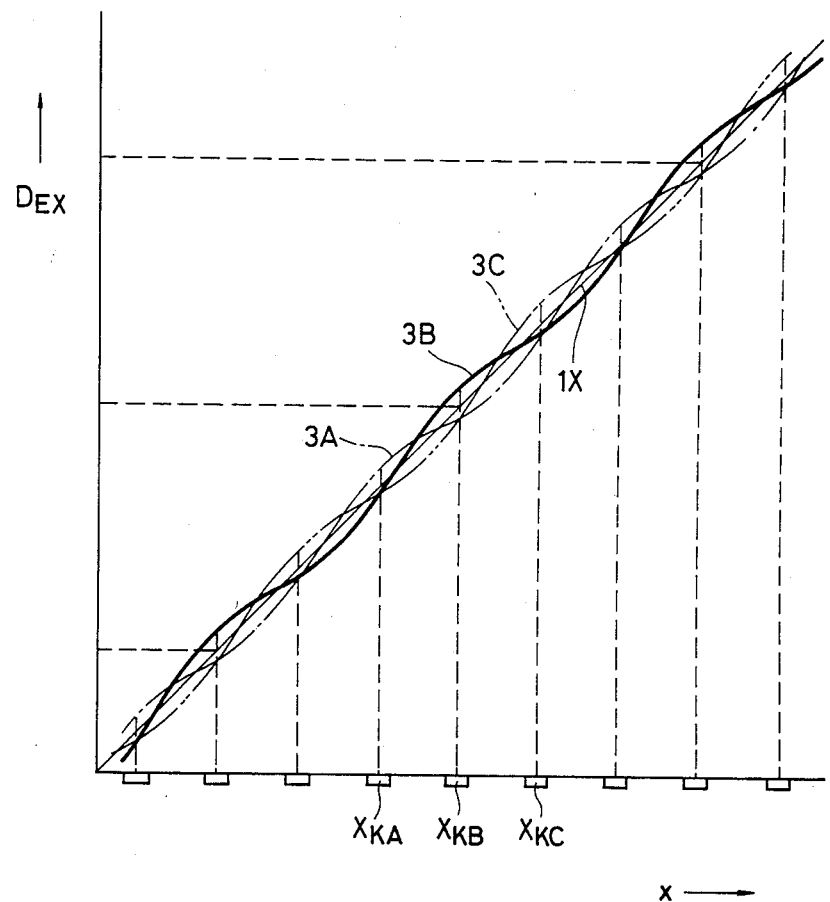
FIG. 14 is a graph used for explaining the detecting characteristic of the embodiment shown in FIG. 7.

On the other hand, output data $D_{EX}$ which are obtained from the counter 55 during the period in which the signal $D_A$ takes the high level within the detecting period $T_X$, are in such a relation with an actual position x of the detecting electrode 20 on the position determining plate 10 in the X direction as shown by a solid line 3B in FIG. 14 similar to the curve 2X in FIG. 5, if only the electrodes $X_{1B}, X_{2B}, \text{---} X_{NB}$ were supplied with the voltage $V_{CC}$ successively, are in such a relation with the actual position x as shown by a dot-dash line 3A in FIG. 14, if only the electrodes $X_{1A}, X_{2A}, \text{---} X_{NA}$ were supplied with the voltage $V_{CC}$ successively, and are in such a relation with the actual position x as shown by a double dot-dash line 3C in FIG. 14, if only the electrodes $X_{1C}, X_{2C}, \text{---} X_{NC}$ were supplied with the voltage $V_{CC}$ successively. However, actually, since the groups of the electrodes $X_{1A}\text{-}X_{1C}, X_{2A}\text{-}X_{2C}, \text{---} X_{NA}\text{-}X_{NC}$ are supplied with the voltage $V_{CC}$ one after another, the output data $D_{EX}$ obtained from the counter 55 within the detecting period $T_X$ are in the linear relation with the actual position x as shown in the line 1X in FIG. 14, which corresponds to an average of the curves 3A, 3B and 3C in FIG. 14.

Now, the above described relations among the curves 3A, 3B and 3C and the line 1X will be explained theoretically hereinafter.

Assuming that each of the groups of the electrodes $X_{1A}\text{-}X_{1C}, X_{2A}\text{-}X_{2C}, \text{---} X_{NA}\text{-}X_{NC}$ is not connected in common and only the electrodes $X_{1B}, X_{2B}, \text{---} X_{NB}$ are supplied with the voltage $V_{CC}$ successively, a voltage $V_B$ which corresponds to the level taken by the signal $S_C$ from the resonant circuit 51 before and after the instant $t_2$ shown in FIG. 13 in the detecting period $T_X$ is expressed with the following equation:

$$V_B = V_X \sin\left\{ \omega\left(t - \frac{x}{P/T_O}\right) + \theta + \Delta\theta \sin\left(\frac{2\pi x}{P} + \phi\right)\right\} \quad (1)$$

where $V_X$ stands for the amplitude, $\omega$ stands for the resonant angular frequency of the resonant circuit 51, P stands for the interval of the electrodes $X_{1B}, X_{2B}, \text{---} X_{NB}$, $T_O$ stands for the period of one cycle of the clock pulse $C_S$, $\theta$ stands for the delay in phase caused by the resonant circuit 51, $\Delta\theta$ stands for the phase amount corresponding to the maximum deviation $\alpha$ of the curve 3B from the line 1X in FIG. 14, and t stands for time.

The inclination of the voltage $V_B$ around the first zero-crossover point on teh way to be negative from positive is to be obtained by differentiating the equation (1) in respect of t and then substituting $t_o$ which represents an instant at which the equation: $V_B = V_X \sin \pi = 0$ is satisfied, for t. However, since $\Delta\theta$ is so small that the third term of the right member of the equation (1) can be neglected, the above mentioned inclination of the voltage $V_B$ can be obtained by differentiating in respect of t the equation:

$$V_B = V_X \sin\left\{\omega\left(t - \frac{x}{P/T_O}\right) + \theta\right\} \quad (2)$$

and then substituting $t_o$, which represents the instant in which the equation:

$$\omega\left(t - \frac{x}{P/T_O}\right) + \theta = \pi \quad (3)$$

is satisfied, for t. Accordingly, the inclination of the voltage $V_B$ mentioned above is expressed in the following equation:

$$\left[\frac{dV_B}{dt}\right]_{t=t_o} = \omega V_X \cos\left\{\omega\left(t_o - \frac{x}{P/T_O}\right) + \theta\right\} \quad (4)$$
$$= \omega V_X \cos \pi$$
$$= -\omega V_X$$

As a result of this, the voltage $V_B$ shown in the equation (1) around the instant represented by $t_o$ is expressed as a voltage $V_B'$ in the following equation:

$$V_B' = -\omega V_X\left\{t - t_o + \frac{\Delta\theta}{\omega} \sin\left(\frac{2\pi x}{P} + \phi\right)\right\} \quad (5)$$

Similarly, assuming that only the electrodes $X_{1A}, X_{2A}, \text{---} X_{NA}$ are supplied with the voltage $V_{CC}$ successively, a voltage $V_A'$ is obtained with the following equation:

$$V_A' = -\omega V_X\left\{t - t_o + \frac{\Delta\theta}{\omega} \sin\left(\frac{2\pi x}{P} + \phi + \frac{2\pi}{3}\right)\right\} \quad (6)$$

and further assuming that only the electrodes $X_{1C}, X_{2C}, \text{---} X_{NC}$ are supplied with the voltage $V_{CC}$ successively, a voltage $V_C'$ is obtained with the following equation:

$$V_C' = -\omega V_X\left\{t - t_o + \frac{\Delta\theta}{\omega} \text{sine}\left(\frac{2\pi x}{P} + \phi - \frac{2\pi}{3}\right)\right\} \quad (7)$$

Actually, since the groups of the electrodes $X_{1A}\text{-}X_{1C}, X_{2A}\text{-}X_{2C}, \text{---} X_{NA}\text{-}X_{NC}$ are supplied with the voltage $V_{CC}$ successively, it is considered that a voltage synthesized with the voltages $V_A', V_B'$ and $V_C'$ as expressed in the following equation:

$$V_A' + V_B' + V_C' = -3\omega V_X(t - t_o) - V_X \cdot \quad (8)$$

$$\Delta\theta\left\{\sin\left(\frac{2\pi x}{P} + \phi\right) + \sin\left(\frac{2\pi x}{P} + \phi + \frac{2\pi}{3}\right) + \sin\left(\frac{2\pi x}{P} + \phi - \frac{2\pi}{3}\right)\right\}$$

is obtained. The second term of the right member of the equation (8) is equal to zero, and consecuently the voltage $V_A' + V_B' + V_B'$ does not have any deviation component at the instant represented by $t_o$ at which the signal $S_C$ from the resonant circuit 51 first crosses over the ground level on the way to be negative from positive.

What is claimed is:

1. A coordinate position digitizing system comprising:

a position determining plate having a plurality of first strip electrodes provided on one surface of an insulating layer to extend parallel to one another in one direction at regularly spaced intervals and form plural groups thereof disposed successively, each of said groups having a successive fraction of the plurality of first electrodes connected in common, and a plurality of second strip electrodes provided on another surface of the insulating layer to extend parallel to one another at regularly spaced intervals in a second direction perpendicular to said first electrodes;

detecting electrode means provided to face to said one surface of the insulating layer and connected through a predetermined capacitance to a reference potential point for producing a signal in response to a voltage obtained thereat, driving and controlling means for supplying a constant voltage selectively to said groups of the first electrodes one after another during a first period and also supplying the constant voltage selectively to said second electrodes one after another during a second period, and means for producing positional data defining positions of said detecting electrode means on said position determining plate in both the one direction of said first electrodes and the second of said second electrodes in response to the signal derived from said detecting electrode means.

2. A coordinate position digitizing system according to claim 1, wherein each of said second electrodes is formed to have a width wider than that of each of said first electrodes.

3. A coordinate position digitizing system according to claim 2, wherein each of first electrodes is arranged with such a width as not to have shielding effect to said second electrodes in respect of said detecting electrode means.

* * * * *